April 29, 1947.   R. HARDY   2,419,550
APPARATUS FOR REMOTELY REPEATING ANGULAR INDICATIONS
Filed May 24, 1943

INVENTOR
RENÉ HARDY
BY Edward D. Phinney
ATTORNEY

Patented Apr. 29, 1947

2,419,550

UNITED STATES PATENT OFFICE 2,419,550

APPARATUS FOR REMOTELY REPEATING ANGULAR INDICATIONS

René Hardy, Lyon, France, assignor to International Standard Electric Corporation, New York, N. Y.

Application May 24, 1943, Serial No. 488,790
In France January 17, 1941

3 Claims. (Cl. 177—337)

The present invention relates to instruments for the remote repetition of angles or remote transmission of angular indications for the purpose of control, operation or supervision.

It is frequently necessary to repeat at a distance, even over very long circuits, some angular indication that defines the momentary position of an element or a member, e. g. the angle formed with the zero mark of a graduated scale by the needle of a dial of a measuring or indicating instrument.

One of the chief objects of the invention is the providing of instruments for the remote repetition of angular distances that are reliable and practically free from inertia during the transmission, in other words, that insure instantaneous repetition of the angular indication that is to be transmitted irrespective of the length of the electric transmission circuits between the place from which the indication is transmitted and the place or places where it is to be received.

An instrument for the remote repetition of angular indications that incorporates features of the invention comprises at the sending end an induction distributor whose rotor is displaced in strict synchronism with the element or member whose angular position is to be signalled and, at each place of reception a cathode ray oscillograph whose control circuits, which are fed by currents proceeding from the sending end, are disposed in such a way that on the screen of the oscillograph there appears a luminous indication of position and/or shape that directly determines the position of the element or member at the sending end.

According to another feature of the invention, the control circuits of the cathode ray tube of such a system for remote repetition are disposed in such a way that the luminous indication obtained is a radial line, and this insures the instantaneous reproduction of the angular position of a pointer that determines the position of an element or member at the sending end.

Figure 1:
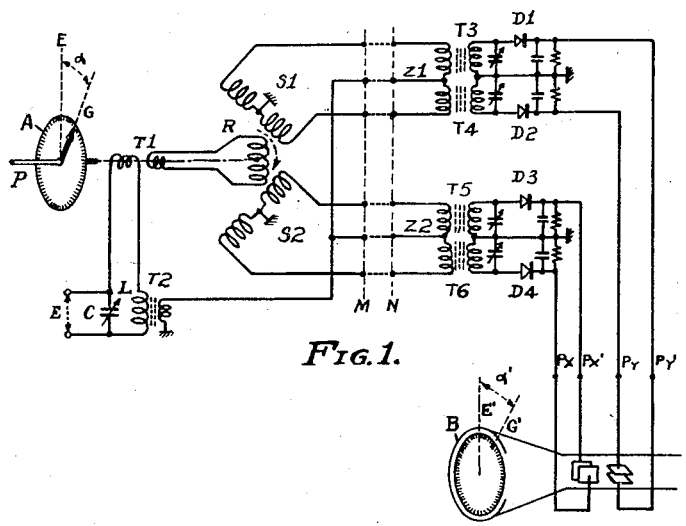
Figure 2:
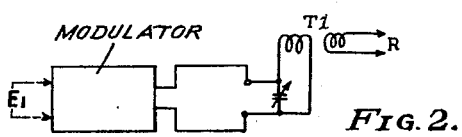
Figure 3:
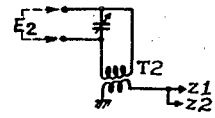

Still further objects and features will be explained in detail in the following description, with reference to the appended drawings, in which Fig. 1 shows one example of the application of the invention to an angle repeater that serves for transmitting angular indications of adjustment from a control station to one or more receiving stations, while Fig. 2 shows a modified form of the sending circuit, and Fig. 3 shows the modified indication which results from the modification shown in Fig. 2.

The circuit illustrated in Fig. 1 permits the sending of the indications of the angle formed by the pointer G on the dial A to a great distance, e. g. 20 to 100 kilometers, and with a substantially total absence of inertia during the time of transmission. The instrument consists of a rotor R which is, for example, keyed on the mechanical shaft P which controls the rotation of the pointer G. The rotor R is fed inductively by a transformer T1 and an oscillatory circuit L—C in which there is a high frequency voltage E, e. g. of 100 kilocycles. Depending on the angle of the pointer G and the position of the rotor R, high frequency currents will be induced in the stators S1 and S2 which are preferably disposed at 90° from each other and are balanced with respect to earth, as shown.

The two stators S1 and S2 are connected to transmission lines and the distance MN may be very great. At the repeater station, the tuned transformer circuits T3, T4 and T5, T6 feed, over rectifier circuits D1, D2 and D3, D4, the two pairs of deflector plates Px, Px' and Py, Py' of a cathode ray tube B. The position of the luminous spot on the screen of the cathode ray tube consequently depends directly on the angular position of the rotor R, and consequently of the pointer G.

At Z1 and Z2, as the primary mid-taps of the supply transformers T1, T2 and T3, T4 there are high frequency feed connections proceeding from the sending station and, for example, fed in common from a transformer T2 whose primary L forms part of the oscillatory circuit that is energized by the high frequency voltage E.

With an arrangement of this kind, by turning the pointer G and consequently the rotor R, and by taking one of the four supply transformers T1 to T4 and examining the shape of the high frequency current that passes through it, it can be seen that the envelope curve of this high frequency current is a sinusoid. Since the two stators S1 and S2 are perpendicular, and the high frequency current is detected at D1 to D4, the luminous spot on the screen of the oscillograph B will take up a position that results from the respective attraction of the two pairs of plates. This position will be determined by a dot located on a circle whose diameter will depend on the size of the high frequency currents that are transmitted.

The initial position of the spot may be adjusted in such a way that the circle it describes is underneath a graduated scale carried by the screen or else by an auxiliary peripheral or transparent slide; according to the position of the rotor R, the position α' of the spot will accordingly make it possible to learn directly the angle α formed by the pointer G with the zero mark E of the graduated scale of the dial A.

For the purpose of making the image obtained at the receiving end more legible, an instrument that incorporates features of the invention is arranged so as to replace the dotted shape of the spot by a radial line shape G' by means of a radial modulation of the circle of the cathode ray oscillograph effected by any suitable method.

According to another feature of the invention, this radial line image may also be made by arranging the high frequency feed circuit at the sending end in the manner shown as an example in Fig. 2. In this arrangement, the feed is divided into two parts: a high frequency voltage E1, e. g. of 100 kilocycles, feeds the rotor R via the transformer with stationary primary T1, while a voltage E2, of the same frequency and in phase, feeds the high frequency connections Z1 and Z2 over the transformer T2. However, the voltage E1 is modulated in amplitude whereas the amplitude of E2 remains constant. After detection, voltages in quadrature modulated radially in accordance with the position of the rotor R are accordingly obtained direct on the plates Px, Px' and Py, Py' of the cathode ray oscillograph B.

In Fig. 3 there is shown the type of indication obtained by the modification of Fig. 2. Parts shown in Fig. 3 which are the same as those shown in Fig. 1 are designated by the same reference letters. The radial line indication is designated by the letter K.

The appearance of a radial line upon the reproducing screen of the cathode ray oscillograph B is brought about as follows. At the instant when the deflecting plates Px, Px' and Py, Py' have, instantaneously, zero potential, the cathode ray beam will be projected through these plates without deflection, so that it will strike the center of the cathode ray screen. Since the voltage $E_1$ is modulated in amplitude, as described in the previous paragraph, the voltages derived at the receiver by rectification of the quadrature voltages transmitted respectively from $S_1$ and $S_2$, will cause the potential upon the respective deflecting plates to vary cyclically. As the magnitude of these voltages is increased, the cathode ray beam obviously will be radially displaced toward the circumference of the cathode ray screen B. Since the voltage $E_1$ is modulated at a frequency lying above the persistance of vision, the repeated radially directed traverse of the cathode ray beam from the center to the circumference of the screen will produce upon this screen the appearance of a radially disposed line.

The angular indication or polar coordinate θ of the apparent line produced on the cathode ray screen will be determined by the ratio of potentials between the respective deflecting systems Px, Px' and Py, Py', the phase reference voltage derived from transformer T2, via Z1 and Z2, furnishing the zero point of reference for such angular indication.

It can be seen that with instruments of this kind it is possible to obtain instantaneously at a receiving station a luminous line that runs from the center of the screen of the cathode ray oscillograph as far as a circular graduated scale; the angle formed by this radial line with respect to a reference direction, e. g. the vertical one, corresponds to the angle formed by the needle of the rotor of the induction distributor at the sending end with respect to the same reference direction. If the position of the rotor is changed, the luminous line on the cathode ray tube becomes instantly displaced by the same angle.

It is evident that the invention is not limited to the examples of embodiments described and shown in the drawings, but is on the contrary capable of numerous modifications and adaptations without departing from its scope. For example, it is possible to use a cathode ray oscillograph whose deflection system is not a deflecting plate system like that shown, while still obtaining the desired radial indication. In certain cases in which it may be desirable to constantly modify the indication given by the pointer G, a demultiplier may be installed between the axis of the pointer G and the mechanical axis of rotation of the rotor R, or else the rotation of R may be effected electrically and not mechanically, by known means. Furthermore, although only one receiving station has been indicated, it is evident that any necessary number may be disposed in parallel on the transmission circuits MN.

I claim:

1. System for the repetition of angular indication by the representation of a radial line on the screen of a cathode ray tube, including at the transmitter a main primary inductor, means for feeding alternating current thereto, means for positioning said inductor in accordance with the angle to be transmitted, two secondary inductors in quadrature and variably coupled to said primary inductor in accordance with the position assumed thereby, transmission lines from each secondary inductor to the receiver, a receiving transformer fed from each secondary inductor, rectifying means connected to each receiving transformer, a cathode ray tube having two deflecting systems for two dimensional determination of the cathode screen spot, means for feeding each deflecting system from a respective receiving transformer, and means for radially modulating the beam of said tube, said last means including at the transmitter means for producing two alternating currents of the same frequency and phase, means for modulating one current in amplitude and feeding it to said main primary inductor, means for feeding said other current between ground and the center point of both secondary inductors and both receiving transformers, whereby after rectification, voltages modulated in quadrature appear at said deflecting systems and thereby cause radial modulation of said screen spot so as to simulate a radial line, and whereby the relative values of said voltages in quadrature determine the polar coordinate θ of said radial line in correspondence with the said position assumed by said main inductor.

2. System according to claim 1, in which the midpoint of each secondary inductor at the transmitter is grounded, and additionally a transmission line is connected to the midpoint of the primary of each receiving transformer and extends to the transmitter, an additional inductor at the transmitter is connected to said last mentioned transmission line at one extremity and is grounded at the other extremity, and a primary winding fed by the same alternating current which feeds said main primary inductor, is coupled thereto, whereby phase reference potential is transmitted to said receiver.

3. System for the repetition of angular indications in accordance with claim 1, in which said means for feeding said other current to said receiver includes a transformer located at the transmitter, having the primary thereof fed by said other current and having one secondary terminal thereof grounded, a transmission line connected to the other secondary terminal and extending to said receiver and means at said receiver for connecting said last mentioned transmission line to the respective midpoint of both said receiving transformers, whereby unmodulated phase reference potential appears at said receiver.

RENÉ HARDY.

REFERENCES CITED

The following references are of record in the file of this patent:

UNITED STATES PATENTS

| Number | Name | Date |
| --- | --- | --- |
| 2,262,033 | Moseley | Nov. 11, 1941 |
| 2,262,245 | Moseley et al. | Nov. 11, 1941 |
| 2,112,824 | Brown et al. | Apr. 5, 1938 |
| 2,233,275 | Wolff | Feb. 25, 1941 |
| 2,283,103 | Stuart | May 12, 1942 |